W. DREVER & C. KELLAHER.
LOG RETAINER.
APPLICATION FILED OCT. 19, 1909.
955,773.
Patented Apr. 19, 1910.
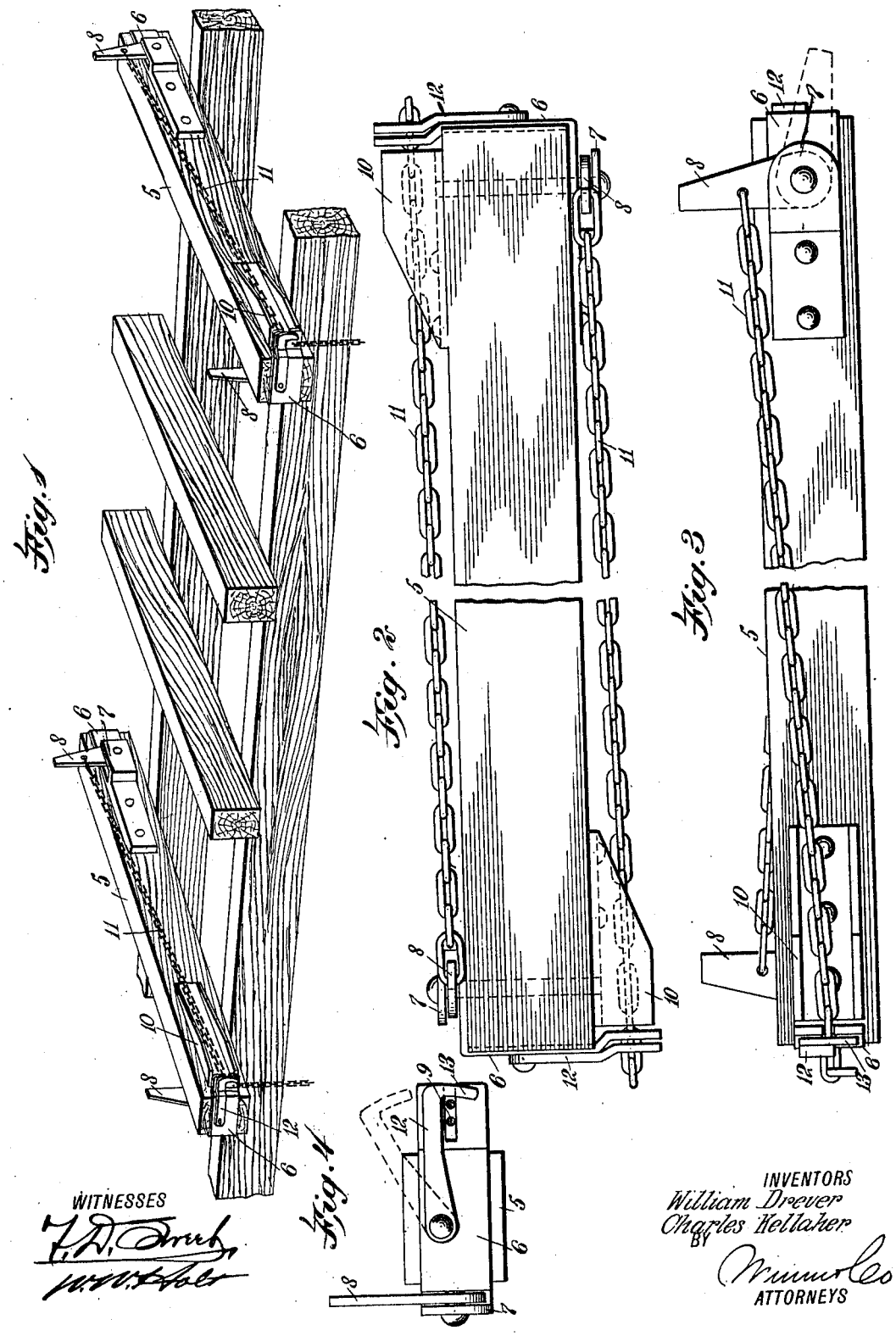
WITNESSES
INVENTORS
William Drever
Charles Kellaher
BY
ATTORNEYS

UNITED STATES PATENT OFFICE.

WILLIAM DREVER AND CHARLES KELLAHER, OF TOMAHAWK, WISCONSIN, ASSIGNORS TO TOMAHAWK IRON WORKS, OF TOMAHAWK, WISCONSIN.

LOG-RETAINER.

955,773.

Specification of Letters Patent. Patented Apr. 19, 1910.

Application filed October 19, 1909. Serial No. 523,410.

*To all whom it may concern:*

Be it known that we, WILLIAM DREVER and CHARLES KELLAHER, citizens of the United States, and residents of Tomahawk, in the county of Lincoln and State of Wisconsin, have invented a new and Improved Log-Retainer, of which the following is a full, clear, and exact description.

The invention is an improvement in log retainers for cars and other vehicles, and has in view such a device embodying a sill having a strap passing around each end from one side of the sill to the other, each strap having at one side of the sill a dog pivoted to swing from below the upper face of the sill to an upright position, and at the other side a chain latch for securing the holding chain of the opposite dog, with the dog and latch at one end of the sill arranged respectively opposite to the latch and dog at the opposite end of the sill, whereby the dog at one side of the car is locked and released at the opposite side of the car.

Reference is to be had to the accompanying drawings forming a part of this specification, in which similar characters of reference indicate corresponding parts in all the views.

Figure 1 is a perspective view of the bed of a logging car having our improved log retainer applied thereto; Fig. 2 is a plan of the log retainer; Fig. 3 is a side view of the same; and Fig. 4 is an end view of the log retainer.

The log retainer embodies in its construction a cross sill 5, having a metal strap 6, bound around each end and extending to the opposite sides of the sill. Each strap at one side of the sill is provided with a fork 7, integrally or separately formed, with the slot in the fork opening outwardly and vertically and arranged to receive a dog 8, the inner or lower end of the dog being pivoted in the fork to swing to an upright position and to a position below the top face of the sill. The end of each strap at the opposite side of the sill is inwardly offset and projects outwardly and is provided with a horizontal slot 9, this offset end of the strap being braced at its inner side by an abutting channel bar 10, secured to and arranged longitudinally of this side of the sill. To each dog 8 is connected intermediate its length a chain or other suitable flexible holding member 11, the links of the chain being adapted to be passed within the horizontal slots of the outwardly-projecting offset ends of the straps and in these slots secured by arms 12, pivoted to swing in a vertical plane, the arms constituting in connection with the slotted ends of the straps, chain latches, and each having a depending finger 13, to overlap the slot and prevent the chain from being disengaged in a sidewise direction. The dog and chain latch at one end of the sill are arranged reversely to the dog and chain latch at the opposite side of the sill; thus the holding chain of each dog passes to the opposite side of the car, where it is easily released to permit of the logs rolling off, without danger to the operator.

Having thus described our invention, we claim as new and desire to secure by Letters Patent:

1. In a log retainer, a sill, a dog pivotally supported adjacent to each end of the sill to swing from a position below the top of the sill to an upright position, a flexible holding member connected to each dog, and latches arranged at the opposite ends of the sill at the opposite sides thereof from the dog to secure said holding members, with the latch and dog at one end portion of the sill arranged respectively opposite to the dog and latch at the opposite end portion of the sill.

2. In a log retainer, a sill, a strap passing around each end of the sill, each strap having a vertically slotted member at one side of the sill and an outwardly-projecting slotted portion at the opposite side of the sill, and a dog pivotally supported in the slotted member of each strap and having a holding chain adapted to be engaged in the slot of the strap at the opposite side of the sill, with the dogs arranged at the reverse sides of the sill.

3. In a log retainer, a sill, a strap passing around each end of the sill to the opposite sides thereof, each strap at one side of the sill having a fork and at the opposite side provided with an outwardly-projecting horizontally-slotted portion, a dog pivoted in the fork of each strap to swing inwardly from a position below the upper face of the sill to an upright position, a holding chain attached to each dog adapted to be engaged in the slotted outwardly-projecting portion of the opposite strap, and an arm pivoted to each strap to swing in a vertical plane into engagement with the chain and having a depending finger arranged to overlap the outer end of the slot in the outwardly-projecting portion thereof.

4. In a log retainer, a sill, straps extending around the ends of the sill to the opposite sides thereof, with each strap at one side of the sill provided with an outwardly-projecting slotted portion, a dog pivoted to each strap at the opposite side of the sill, and a holding chain attached to each dog and adapted to be engaged in the outwardly-projecting slotted portion of the strap at the opposite end of the sill.

5. In a log retainer, a sill, a dog pivotally supported at one side of the sill to swing from a position below the top of the sill to an upright position, a holding chain attached to the dog, a slotted member to receive and engage the links of the chain, extending outwardly from the side of the beam at which the dog is pivoted adjacent to the opposite end thereof, and a channel beam through which the chain is adapted to pass, supporting the said member at the inner side.

In testimony whereof we have signed our names to this specification in the presence of two subscribing witnesses.

WILLIAM DREVER.
CHAS. KELLAHER.

Witnesses:
PAUL R. PHILLEO,
G. M. SHELDON.